United States Patent [19]

Bachinger

[11] 4,037,884
[45] July 26, 1977

[54] TOGGLE OR THE LIKE

[75] Inventor: Peter Bachinger, Bronnamberg, Germany

[73] Assignee: International Standard Electric Corporation, New York, N.Y.

[21] Appl. No.: 627,199

[22] Filed: Oct. 30, 1975

[30] Foreign Application Priority Data

Oct. 30, 1974 Germany .............................. 2451658

[51] Int. Cl.² .............................................. F16C 7/00
[52] U.S. Cl. ..................................... 308/2 R; 74/523; 200/153 G
[58] Field of Search ............... 308/2 R, 2 A; 200/329, 200/332, 336, 153 G, 335; 74/473 R, 523

[56] References Cited

U.S. PATENT DOCUMENTS

| 1,736,849 | 11/1929 | Douglas | 74/523 |
| 2,726,105 | 12/1955 | Koenig | 308/2 R |
| 3,604,286 | 9/1971 | Foreman | 74/523 |
| 3,657,496 | 4/1972 | Davidson | 200/336 X |
| 3,867,604 | 2/1975 | Discenza | 200/153 G X |

Primary Examiner—Joseph F. Peters, Jr.
Assistant Examiner—Gene A. Church
Attorney, Agent, or Firm—A. Donald Stolzy

[57] ABSTRACT

In a tumbler switch, a lever is supported by a bearing in a cylinder in which space is limited. The load on the bearing is to be evenly distributed over portions of walls of the cylinder. The bearing which is used is a ball bearing, the direction of rotation of which is limited to one axis. The bearing includes a ball that has spaced flat end surfaces located in parallel planes. This type of toggle bearing is especially useful when employed in a switch housing.

3 Claims, 6 Drawing Figures

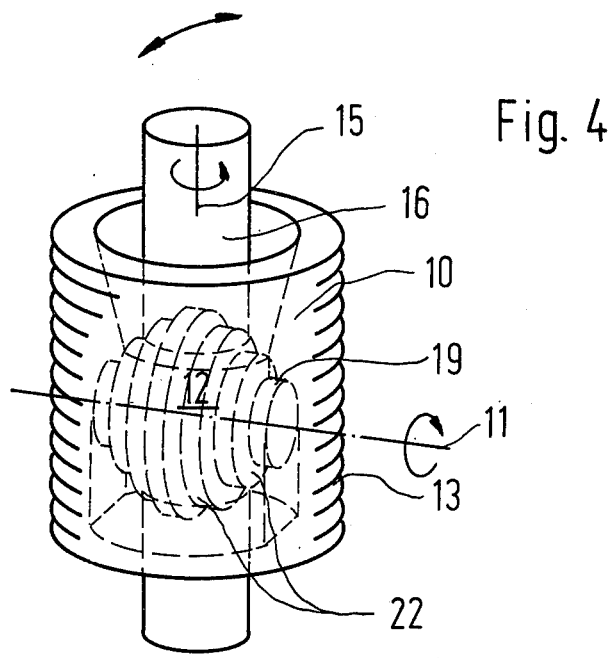
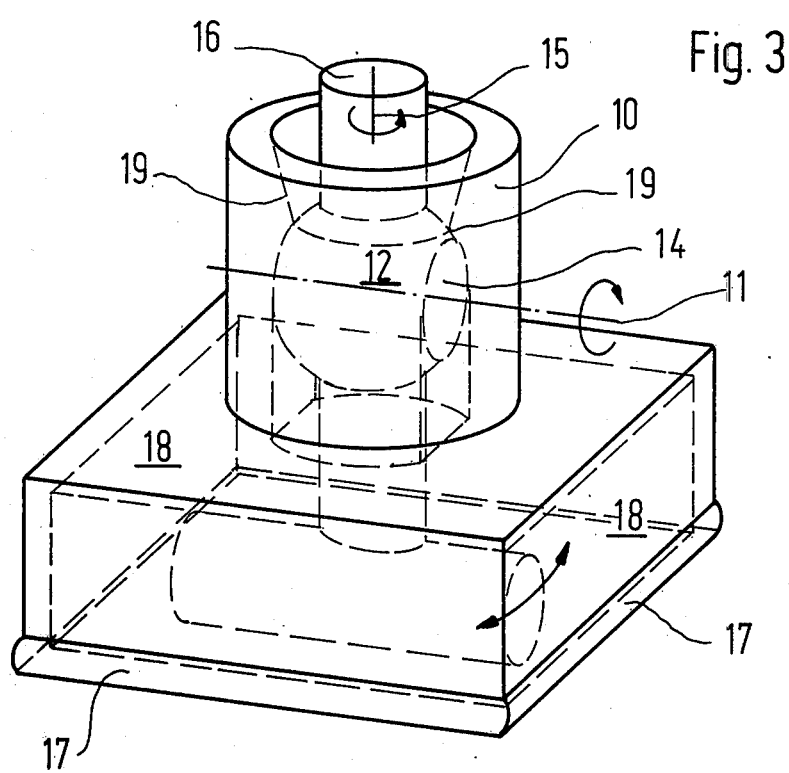

TOGGLE OR THE LIKE

BACKGROUND OF THE INVENTION

The present invention relates to a toggle or the like which includes a lever supported in a cylinder. The lever axis of rotation is perpendicular to the axis of said cylinder which, by itself, is conventional. The toggle can be employed, for example, to guide the lever of a toggle switch. The aforementioned bearing, in this case, must be fitted into the cylinder perpendicular to the cylinder's axis.

Some prior art in the above-described filed will be found in the following United States patents.

| U.S. Pat. No. | Issue Date |
|---|---|
| 2,192,031 | February 27, 1940 |
| 3,293,397 | December 20, 1966 |
| 3,482,465 | December 9, 1969 |
| 3,604,286 | September 14, 1971 |
| 3,867,604 | December 18, 1973 |

Lever bearings are known as cylinder bearings in the form fo bushes, for example (cf. Max Pollermann, "Bauelemente der physikalischen Technik", Berlin 1972, p. 78 etc.). However, none of these bearings can be readily fitted into a cylinder casing lying perpendicular to a lever axis. This is true because the same requires different thicknesses of cylinder casings.

notwithstanding the foregoing, the bearing problem is by no means limited to toggle switches.

A bearing should have large bearing surfaces perpendicular to the forces acting on the bearing so that the forces are evenly distributed. However, a bearing cylinder mounted perpendicularly in a hollow cylinder may be of very small.

Other bearings are known which require complicated manufacturing steps.

SUMMARY OF THE INVENTION

The above-described and other disadvantages of the prior art are overcome by providing spherical bearing body and a cylinder surrounding the bearing, both body and cylinder having mating flat surfaces in parallel planes.

Guidance is also advantageously achieved by means of a ball composed of cylindrical or similarly shaped discs which may lie on the circumference or at a poles of the ball. In an especially simple embodiment of the invention, a ball bearing is provided with grooves or flutes which are engaged by at least one guide pin. If movement about two cylinder axes should be desired, it is only necessary to provide crossed grooves.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 3 is a perspective view of a bearing constructed according to the invention whose bearing ball has areas flattened at poles and which has been fitted into a compact switch structure;

FIG. 4 is a perspective view of a bearing constructed according to the invention which has been formed from cylindrical discs;

DESCRIPTION OF THE PREFERRED EMBODIMENTS

Figure 1:
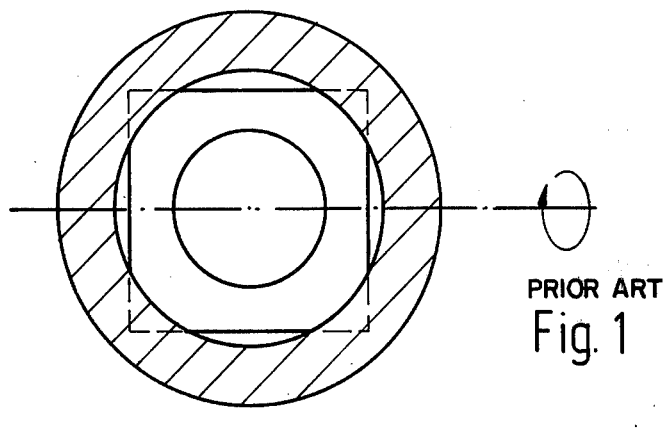
FIG. 1 is a transverse sectional view of a prior art toggle with a cylindrical bearing.
Figure 2:
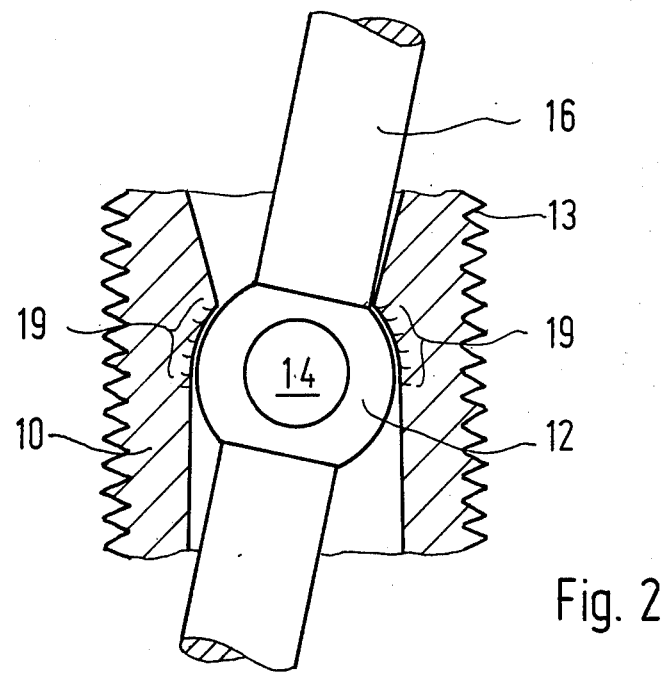
FIG. 2 is a vertical sectional view of a lever bearing constructed according to the present invention.

A hollow cylinder casing 10 is shown in FIG. 2. Cylinder casing 10 carries an external thread 13 for threading into equipment, not shown. Inside the cylinder casing 10, a bearing bush 19 is shown into which a ball-like bearing of a lever 16 is fitted from below. At its poles, the bearing ball 12 has flats 14 which serve to prevent rotation of the lever 16 about its own axis.

In the example shown, movement about only one axis 11 is achieved by modifying a ball bearing to such an extend that there is freedom of movement in only one direction of rotation. Movement in other directions of rotation is prevented by the flats 14.

FIG. 3 also shows the advantages of the bearing of the invention. It is also shown in FIG. 3 that the cover adjoining the casing 10 is sealed from the next connecting by structure means of a seal ring 17. This seal ring 17 may be united with a cap 18.

Figure 5:
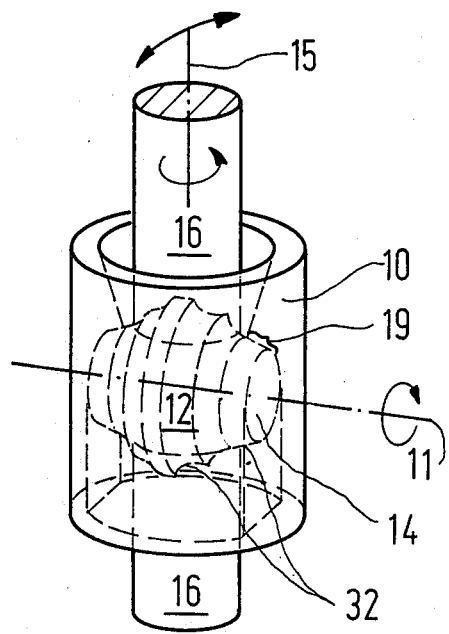
FIG. 5 is a perspective view of a bearing constructed according to the invention which has been formed from spherical discs.

The spherical bearing body 12 may have cylindricl discs 22 as shown in FIG. 4. The shapes of these cylindrical discs correspond exactly to the effective guideways on the bearing ball. Such a bearing ball is somewhat more difficult to make than a simple ball with flats 14. It is not necessary, however, to produce precise cylindrical surfaces. It is also possible to form spherical or other surfaces 32 approximately in the form of cylindrical discs, as shown in FIG. 5. It is only necessary that the bearing body and the bearing bush are approximately adapted to fit one another. This is achieved, for example, by making the bearing body 12 or the bearing bush 19 of different materials, only one or both being soft, the other being hard or soft.

Figure 6:
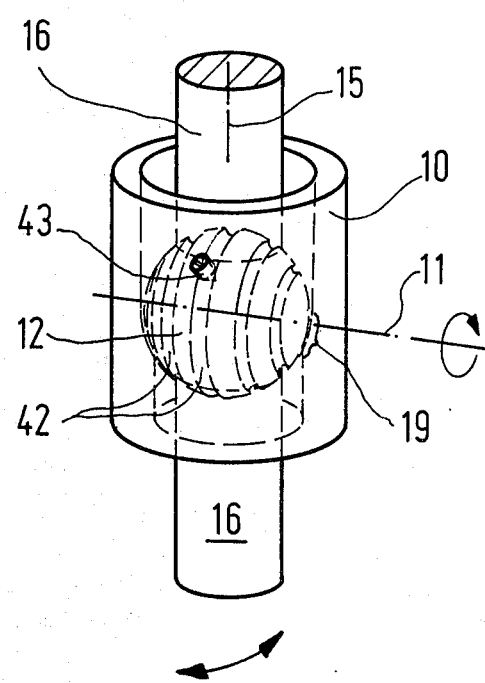
FIG. 6 is a perspective view of a bearing constructed according to the invention which has a ball provided with grooves.

According to the invention, rotation of the lever about its axis is also prevented if the spherical bearing body 12 is provided with grooves 42 (FIG. 6) extending in the same direction as the cylindrical discs 22 of FIG. 4. In this case, the bearing bush 19 needs to have only one lug engaging a groove 42 to prevent rotation about the lever axis 15. This lug includes a screw 43.

It is also possible, however, to form corresponding lugs or spikes as integral parts of the cylinder casing.

What is claimed is:

1. Apparatus including a toggle or the like, said apparatus comprising: a hollow cylinder; an approximately spherical body supported inside said cylinder in a manner to rotate about an axis normal to that of said cylinder, the internal surface of said cylinder having at least one annular groove, and said body having an annular disc fitting in said groove; and a stub shaft fixed to said body and thereby movable therewith.

2. Apparatus including a toggle or the like, said apparatus comprising: an approximately spherical body supported inside a hollow cylinder in a manner to rotate about an axis normal to that of said cylinder, the internal surface of said cylinder having at least one annular disc, and said body having an annular groove to fit around said disc; and a stub shaft fixed to said body and thereby movable therewith.

3. Apparatus according to claim 1, wherein a screw is fixed to said cylinder in a position to guide said body by projecting into said groove.

* * * * *